UNITED STATES PATENT OFFICE.

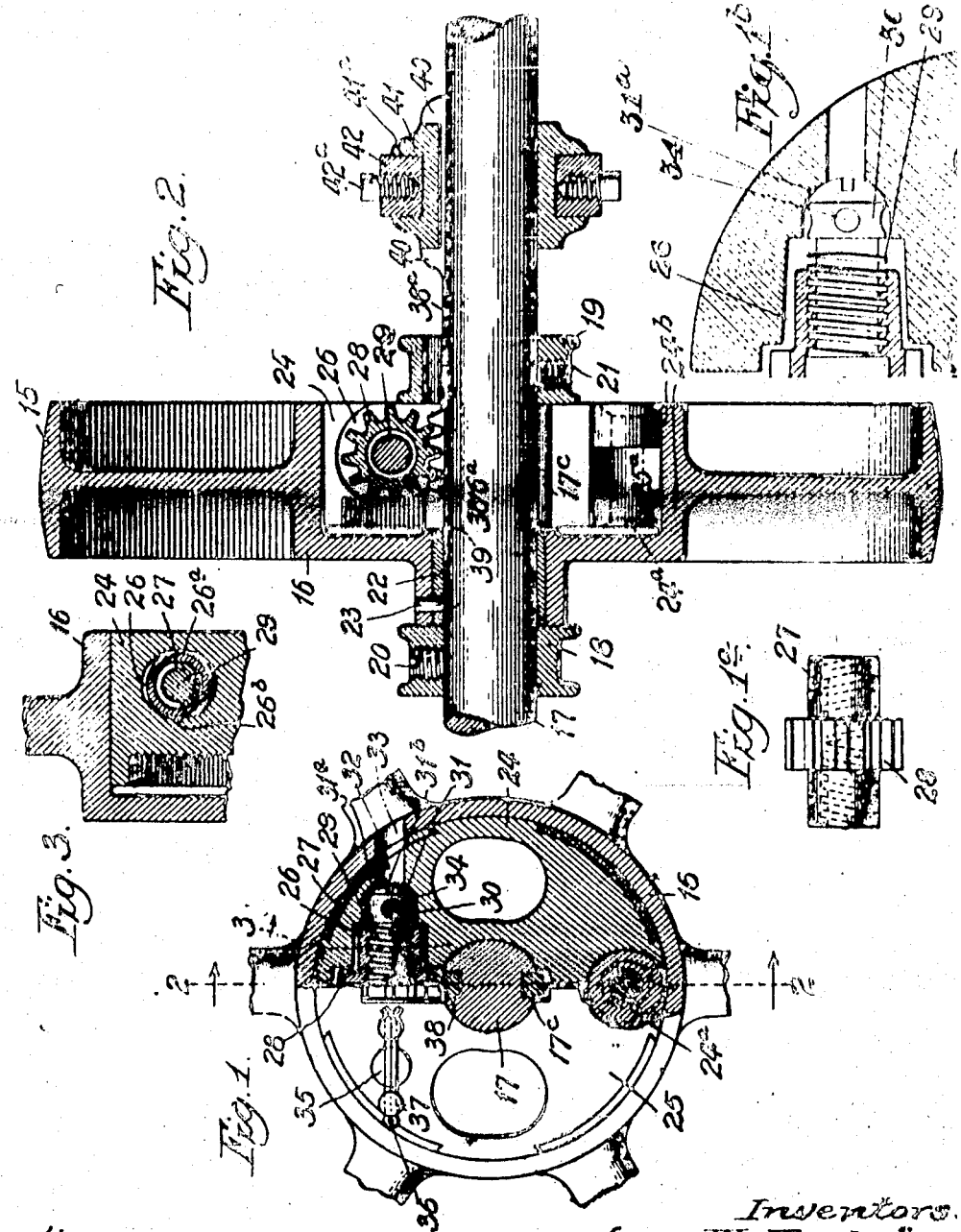

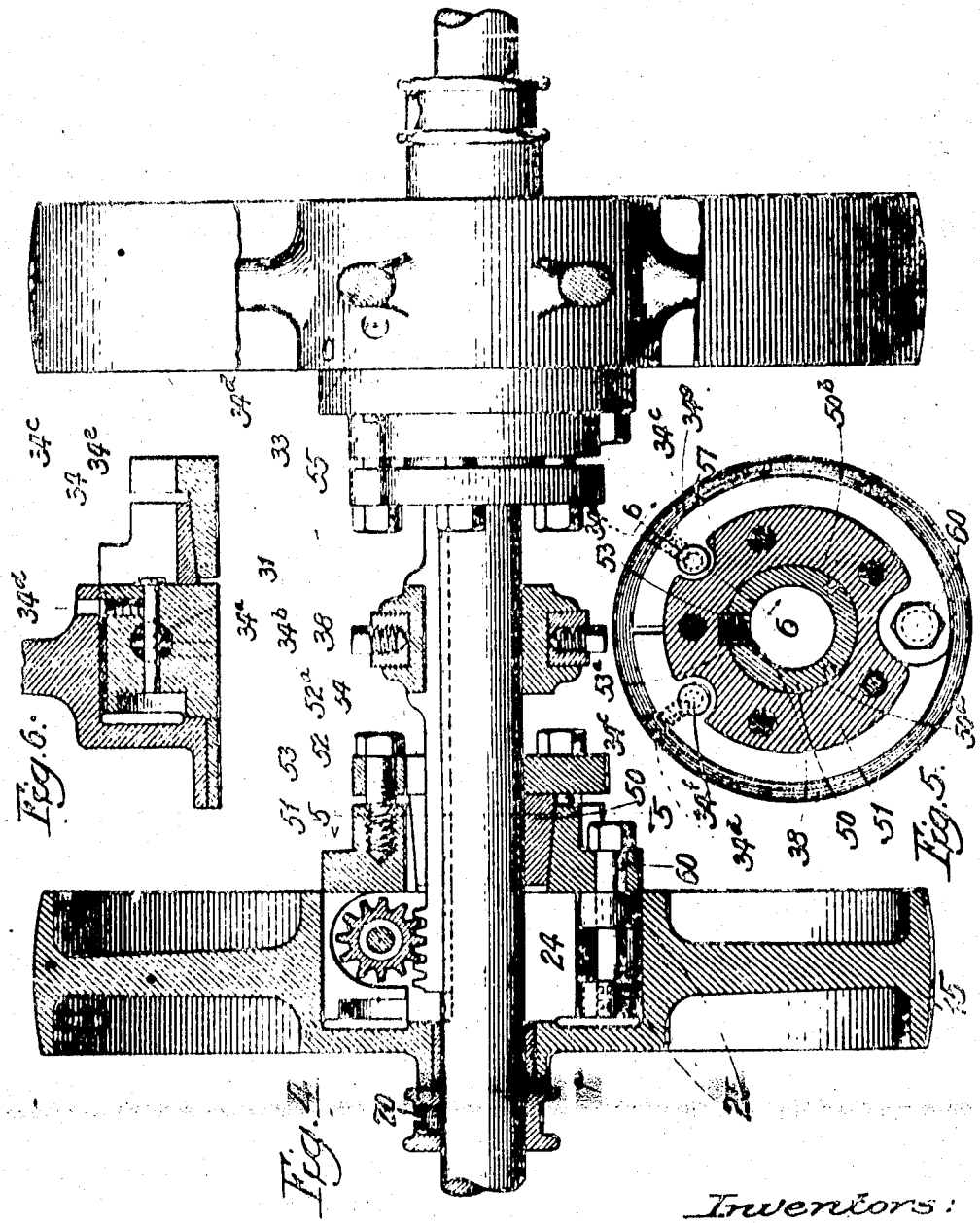

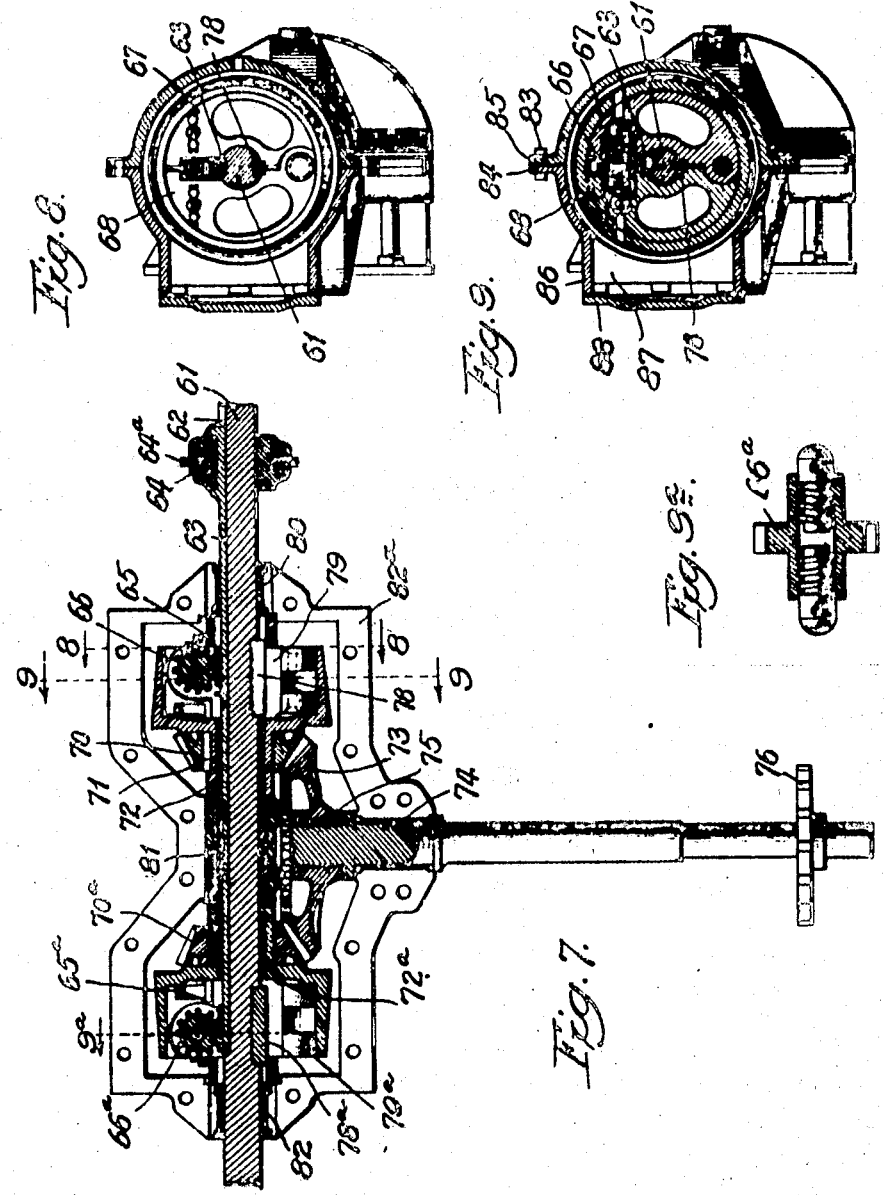

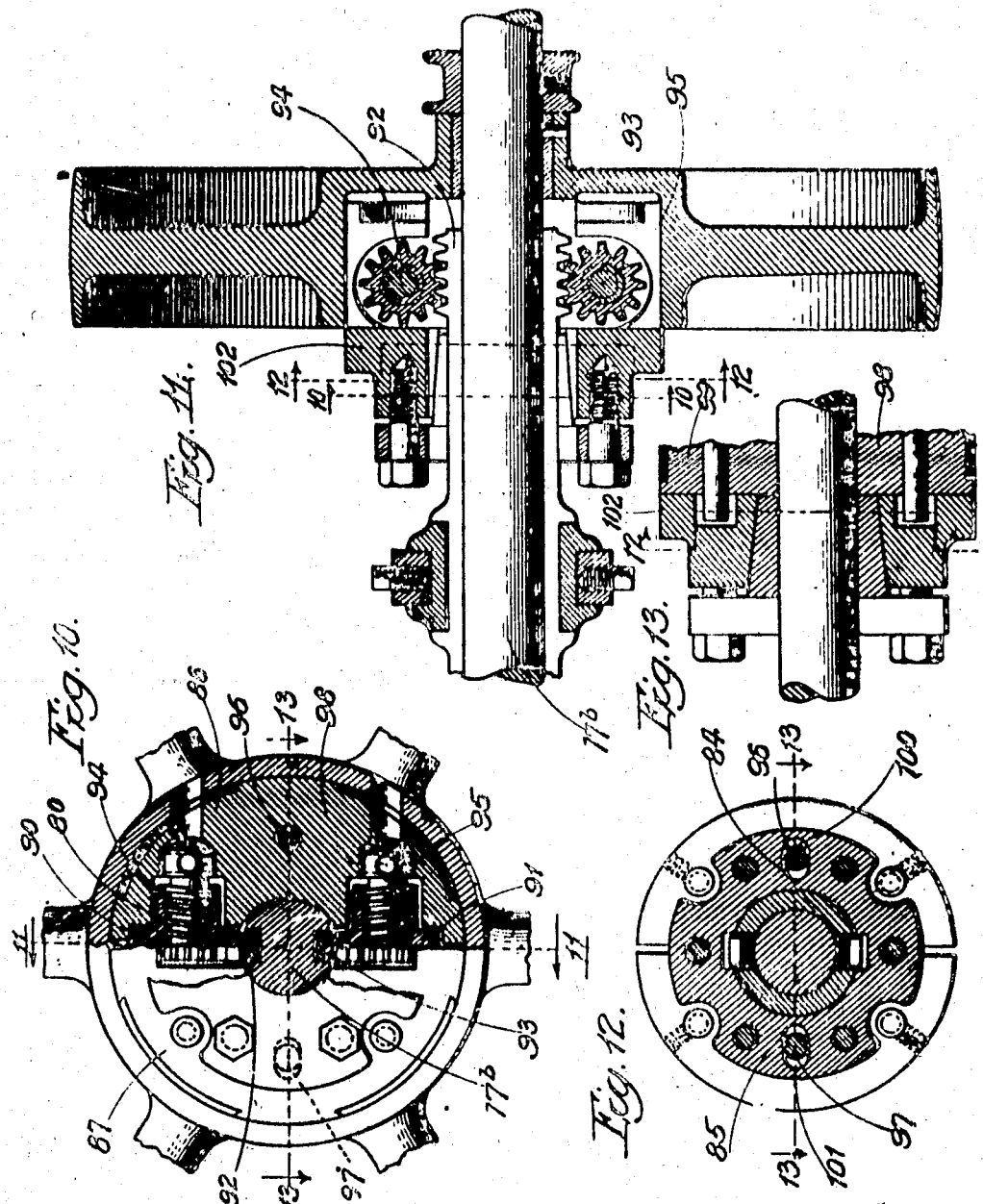

HENRY W. JACOBS AND HOWARD H. LANNING, OF TOPEKA, KANSAS.

FRICTION-CLUTCH.

975,621.          Specification of Letters Patent.          Patented Nov. 15, 1910.

Application filed April 8, 1910.  Serial No. 554,134.

*To all whom it may concern:*

Be it known that we, HENRY W. JACOBS and HOWARD H. LANNING, citizens of the United States, residing at Topeka, in the county of Shawnee and State of Kansas, have invented certain new and useful Improvements in Friction-Clutches, of which the following is a specification.

Our invention relates to clutches of the type in which power and motion are transmitted by friction from one cylindrical element to another, and in which one of said elements is divided into parts, the said parts being capable of relative movements by which they are brought into frictional contact with the other element.

Figure 1 is a sectional view, partly in elevation, of the hub of a pulley to which our improved clutch has been applied. Fig. 1ª is a detail showing the gear which actuates the movable parts of one element of the clutch. Fig. 1ᵇ is an enlarged sectional detail view of part of the structure shown in Fig. 1, the section being taken as represented at the right of Fig. 1. Fig. 2 is an axial section of said pulley and clutch taken on the line 2, 2 of Fig. 1. Fig. 3 is a detail in section taken on the line 3, 3 of Fig. 1. Fig. 4 is an axial section showing a modification of the means, whereby one of the clutch elements is secured to the shaft. In this view two pulleys are shown attached to a shaft, with clutches applied thereto, which are operated by a single lever, or other actuating means. In this view one of the pulleys and its clutch are shown in elevation with a portion of the pulley rim broken away. Fig. 5 is a cross sectional view on the line 5, 5 of Fig. 4. Fig. 6 is a sectional detail along the line 6, 6 of Fig. 5. Fig. 7 is a sectional view of our clutch as applied to a shaft which transmits its power to another shaft at right angles thereto. This form of our invention is particularly adapted for use in automobiles, or where a reversing gearing is needed. Fig. 8 is a cross section substantially along the line 8, 8 of Fig. 7. Fig. 9 is a cross section along the line 9, 9 of Fig. 7. Fig. 9ª is a sectional detail on line 9ª of Fig. 7. Fig. 10 is a sectional view partly in elevation of the hub of a pulley in which a modified form of our clutch is used. Fig. 11 is an axial section of the same taken on the line 11, 11 of Fig. 10. Fig. 12 is a cross section substantially on the line 12, 12 of Figs. 13 and 11. Fig. 13 is an axial section of a portion of the clutch taken along the line 13, 13 of Fig. 12.

Similar numerals of reference are applied to similar parts in the different views.

We accomplish the principal object of our invention by means of the small gear or pinion 26 which has an elongated hub 27 threaded upon right and left hand screws 29. These screws 29 are pivotally attached to the movable parts of one of the clutch elements. This clutch element has a cylindrical form and is divided into two parts which will be described later, the said parts being given a movement to cause them to engage another hollow cylindrical element by means of the said screws.

We preferably place the divided clutch element within the hollow ring or cylindrical hub of the driven element. We may, however, place the divided clutch element on the exterior of the said driven element, in which case the parts of the driving element will be moved inwardly when brought into engagement with the driven element.

Referring more particularly to Figs. 1 and 2 of the drawings, it will be seen that we have applied our clutch to a pulley 15, which has an enlarged hub 16 in which there is a cylindrical bore for receiving the driving element of our clutch. It is of course immaterial which of the two elements of our clutch mechanism be considered the driving element, it being obvious that power may be transmitted in either direction from one element to the other. For convenience in description, however, we refer to the friction elements 24 and 25 and corresponding parts in the other forms of the structure as the driving element, but do not limit ourselves to the use of the structure in this manner as it will be obvious that power may be applied to the pulley and transmitted from there to the shaft.

The pulley 15 is loosely mounted upon the shaft 17 and is held against endwise movement by the collar 18. The inner or driving clutch element is held against endwise movement in the other direction by the collar 19. The collars 18 and 19 are secured rigidly to the shaft by set screws 20 and 21. The rotary motion is transmitted from the shaft 17 to the inner or driving element by means of the key 17ᶜ. The inner or driving clutch elements have an end bearing at 16ª upon the hub of the pulley or driven element. It will therefore be seen that the parts are efficiently held in proper relative position on the shaft 17.

The hub of the pulley 15 is provided with the bushing 22, which bears upon the shaft 17, and said bushing is held in place by a pin 23.

The inner or driving clutch member is divided into two parts 24 and 25 which are pivoted to each other by means of the pin 24ª. The two parts 24 and 25 taken together are cylindrical in their general form and the pivot pin 24ª joins them together at a point near their circumferential surface.

The part 24 is provided with eyes 24ᵇ between which is inserted an eye 25ª on the part 25. The pin 24ª is inserted through said eyes 24ᵇ and 25ª and in this manner the said parts are pivotally connected.

In the parts 24 and 25 we provide sockets or cavities 26 in which are placed the hubs 27 of the gear 28. These sockets are located in that part of the driving element which is opposite to the pivot pin 24ª.

The gear 28 has elongated hubs 27 which project in opposite directions from the body of the gear, and each one of the elongated portions 27 is placed in one of the sockets 26 in one of the parts 24 and 25.

The elongated hubs 27 are internally threaded and fitted to screws 29 which are pivotally attached to the parts 24 and 25. By placing the female member, i. e., the internally threaded sleeve 27 carried by the spur gear 28, in the center and mounting the male screw 29 upon the friction members the mechanism can be applied to a smaller clutch than if the reverse arrangement were adopted. The smaller diameter of the male screw 29 renders it possible to locate its spherical seat comparatively close to the outer curved surface of the friction member in which it is mounted. The screws 29 are provided with heads 30, which have spherical ends which bear upon a corresponding spherical seat 31ª in the parts 24 and 25.

The threads of the screws 29 are right and left, respectively, so that when the gear 28 is rotated the screws 29 are caused to move inwardly or outwardly depending upon the direction of the rotation of the said gear.

The gear 28 meshes with a rack 38 which is fitted to the groove 39 in the shaft 17. The rack 38 is provided with sufficient teeth to properly mesh with the gear 28 and give it the desired movement. The rack has an extension 38ª which is provided with lugs 40 for receiving an operating sleeve 41. The operating ring 42 is fitted to this sleeve and is provided with pins 42ª to which an operating lever may be pivoted, as is common in clutch mechanism and which it is not thought necessary to illustrate in these drawings.

Referring again to the screws 29, it will be seen that they have slots 31ᵇ in their heads, whereby a screw driver may be used for adjusting them. This adjustment will be made through an aperture 32 in the parts of the driving element 24, when the said aperture is brought into register with a similar aperture 33 in the hub of the pulley or driven element.

The screws 29 are pivotally attached to the parts 24 and 25 by pins 34 which are fitted to said heads and to suitable holes in the parts 24 and 25 adjacent thereto. This construction is more fully shown in Fig. 6. In order to permit a fine adjustment of the screws 29 two holes 34ª and 34ᵇ at right angles to each other, are provided in the head 31 for the pin 34. It will be seen that by removing the pin 34 and applying a screw driver to the slot 31ᵇ in the head 30, an adjustment of the screws in the gear 28 may be made for the purpose of taking up the wear of the parts 24 and 25 of the driving element of the clutch.

The cavities 26 are oval or approximately elliptical in cross section, as shown in the drawing, particularly in Figs. 1, 1ᵇ, 3, 9 and 10. As shown in the drawings the larger dimensions of the cavities 26 permit a limited rotation of the screws 29 on their pivot pins 34, but at the points midway between the clearance spaces the screws 29 and hubs 27 of the gears 28 have a snug bearing upon the inner surface of the cavities 26, thereby effectually preventing any bending or distortion of the screws 29 or of the hub 27 of the gear 28 under the thrust of the operating rack 38.

It will be noted that the gear 28 with its hubs 27 is supported exclusively upon the screws 29 which are pivoted to the movable friction members 24, thus leaving the gear with its hubs free to move toward and from the point of pivotal connection between the friction members 24 as said members are separated or drawn together in applying or releasing the clutch, and that the pivotal mounting of the screws 29 permits the screws to aline with the hubs 27 of the gear 28 in all positions.

Referring again to Fig. 1 the pins 34 and 35 are held in position by split keys 36 which lie over the heads of said pins and are held in this position by posts 37, which have apertures in which the said keys 36 are placed.

In the modification shown in Fig. 6 we use a set screw 34ᶜ for holding the pins 34 and 35 in position. This arrangement is necessary when we use our modified form of holding device for securing the driving element to the shaft, which holding device is illustrated in Figs. 4, 5 and 6. The pin 34 is held in position by a small set screw 34ᶜ which may be reached through an aperture $34^d$ in the hub of the pulley when said aperture is brought into register with the threaded aperture in which the said screw is inserted. The pins 34 may be withdrawn from the parts 24 and 25 by inserting a screw driver, or other tool, beneath the heads $34^e$ thereof.

Referring to Fig. 3 it will be seen that the recesses 26 are elongated slightly in a radial direction in order to provide clearance for the hubs 27 of the gears 28. The said hubs 27, however, bear at the sides of the said recesses at points $26^a$ and $26^b$. This is necessary in order to provide a bearing for the gear when the rack 38 is actuated.

Referring to Figs. 4, 5 and 6 there will be seen a modification in the method of affixing the driving element to the shaft $17^a$. This method of fixing consists of a clamping device which is tightly wedged into contact with the shaft $17^a$, and the friction resulting therefrom provides the necessary means of attachment. This clamping device comprises a split conical ring 50, which is driven into the conical bore of a ring 51 by another ring 52. The ring 52 is drawn toward the ring 51 by the screws $52^a$, which are passed through holes in the ring 52 and threaded into the ring 51. The split conical ring 50 is slotted widely at $53^a$ to permit the insertion of the rack bar 38. The ring 51 is also recessed at 53 to permit clearance of the teeth of the rack. The split conical ring is slotted nearly through at two other points, $50^a$ and $50^b$, to provide flexibility in said ring 50. The ring 52 is also recessed at 54 to permit the insertion of the rack bar 38. The ring 51 serves as a means for supporting the pivot bar or bolt 60, to which the two parts 24 and 25 are pivotally attached in this form of the device. The parts 24 and 25 are, therefore, rotatively attached to the shaft $17^a$ by means of the pin 60, the ring 51, and the split conical ring 50. In this modified form of our device it is necessary to provide recesses 57 in the ring 51 to permit the removal of the pins $34^f$ and $34^g$, which correspond to the pins 34 and 35 in Fig. 1. In this case it is necessary to loosen the set screws $34^e$ to permit the withdrawal of said pins $34^f$ and $34^g$. This may be done by inserting the screw driver into the aperture $34^d$ as previously described.

In Figs. 7, 8 and 9 we have illustrated a modification of our invention which renders it applicable to automobile driving mechanism or to similar devices, where it is desired to drive a shaft at right angles to the power or driving shaft and to reverse the movement. In these figures the driving shaft 61 is shown as being adjacent to the end of the driven shaft 74 and extending indefinitely in either direction. The shaft 61 is provided with a groove 62 in which is slidably fitted the rack 63. This rack is adapted to actuate the gears 66 and $66^a$ of two clutches for transmitting motion in either direction to the shaft 74. The rack 63 is actuated by a ring 64, in which are pins $64^a$ to which an operating lever is pivotally attached in the usual manner. The rack bar 63 is provided with teeth 65, which mesh with the gear 66 of one of the clutches and is also provided with teeth $65^a$, which mesh with the other gear $66^a$ of the other clutch. One of these clutches is adapted to drive the shaft 74 in one direction, while the other is adapted to drive it in the opposite direction. This is effected by so arranging the threads of the screws which are engaged by the gears 66 and $66^a$ that a rotation of the said gears in one direction will cause one clutch to engage and the other to release, while the motion of said gears in the opposite direction will produce the reversed effect. This result is brought about by simply reversing the threads upon the screws in the two gears 66 and $66^a$. In other words, the corresponding screws in the gears 66 and $66^a$ will have right and left hand threads, respectively. This is shown in Figs. 9 and $9^a$. In this application of our invention the parts 67 and 68 of the driving element of the clutch correspond in every particular with the forms shown in Figs. 1 and 2.

The clutch in this form is provided with a bevel gear 70 which is fixed to the extended hub 72 by the key 71. The bevel gear 70 meshes with the bevel gear 73, which is secured to the shaft 74 by the key 75. The shaft 74 may be provided with a sprocket wheel 76 or other suitable means for transmitting the power to the mechanism which is to be driven by it. The clutches are rotatively secured to the shaft 61 by the keys 78, $78^a$. Another bevel gear $70^a$ is secured to the hub $72^a$ of the other clutch $79^a$ in a similar manner to that previously described for the clutch 79. This bevel gear $70^a$ meshes with the bevel gear 73 and drives it when the clutch $79^a$ is engaged with the shaft 61. The shaft 61 is provided with suitable bearings 80, 81 and 82 and said bearings, as well as the greater part of the mechanism above described, is inclosed in the casing $82^a$. This casing is preferably made in two halves secured together by bolts 83 in the flanges 84 and 85. One half 86 of the casing is provided with an opening 87 to permit access to the mechanism, and said opening is provided with a cover 88.

In Figs. 10, 11, 12 and 13 we have shown a modification of our clutch, in which the two halves of the driving element are not pivotally attached to each other, but are provided with gears and screws on both sides of the shaft $17^b$, by which means the two halves are given parallel engaging motions. The gears 90 and 91 are operated simultaneously by the racks 92 and 93. Because of the fact that the said racks engage the gears 90 and 91 at opposite sides, the said gears 90 and 91 will have rotary movements in opposite directions, and therefore the corresponding screw threads of the screws 94 and 95 will have to be oppositely arranged. In other words, the thread of the screw 94 will be left-handed while the thread of screw 95 will be right-handed. In all other respects the mechanism is duplicated on the opposite sides of the shaft. In this modification of our invention it becomes necessary to provide a different means for transmitting the rotary motion of the shaft to the driving element of the clutch. The two parts of the driving elements will have a rectilinear motion when actuated, so that said parts will move simultaneously only in parallel directions away from or toward the shaft. In order to transmit the said rotary motion under these conditions, we have provided pins 96 and 97, which are fixed in the two parts 98 and 99 of the driving element and which project into radially disposed slots 100 and 101 in the ring 102. The ring 102 is rotatively secured to the shaft 17ª in the manner described in connection with the ring 51 in the form shown in Figs. 4, 5 and 6. In every other respect this form of our invention is substantially the same as previously described.

The operation of our invention has already been largely referred to, and it may further be mentioned that the shaft 17 may be considered the driving shaft, which usually is connected to an engine or motor or other prime motor. The power and rotary motion of the shaft 17 is transmitted to the two parts 24 and 25 by the key 17ᵉ. The parts 24 and 25 of the driving element fit the said key 17ᵉ loosely in order to permit the necessary clutching movement of the said parts, but this loose fit is otherwise entirely immaterial. The operator may cause an engagement with the driven element by actuating the lever connected with the ring 42 in the usual manner in which clutches are commonly operated. The ring 42 transmits its motion to the sleeve 41, which in turn transmits the motion to the rack bar 38ª, and the rack teeth 38 cause the rotation of the gear 28. The said gear 28 will cause a movement of the screw 29, the latter being held against rotation by the pin 34. It is understood, of course, that the gear 28 transmits the said movement to two screws 29, each of which is pivotally attached to one of the parts 24 and 25 of the driven element. The movement imparted to the parts 24 and 25 causes them to be pressed against the inner cylindrical surface of the driven element with greater or less force, depending upon the pressure exerted by the operator upon the lever which actuates the ring 42. By means of this screw principle, we are enabled to apply the pressure between the clutch elements very gradually by a steady pressure of the operator's hand on the controlling lever. By the use of this principle a sudden shock or jar is entirely prevented. In use of other forms of clutches, particularly those in which a wedging connection is used, the operator finds it necessary to cause the engagement of the clutch elements by a sudden movement of the lever.

By the use of our screw principle, we are enabled to produce a heavy pressure on the friction surfaces by applying a light pressure to the controller lever. We are therefore enabled to use relatively small friction surfaces and a very light controlling mechanism, and our clutch may be given a very compact and simple form. Our clutch is also self adjusting, for the reason that as the surfaces become worn away, the range of movement of the screws necessary to bring the friction surfaces into contact gradually increases and takes up the wear. This range of movement will continue as the wear increases until the clutch elements become worn to such a degree that the sliding rack bar 38ª comes into contact with the end of the slot 39 in the shaft 17. When this condition is reached, the clutch may be reset by removing the pins 34 and 35, or 34ᶠ and 34ᵍ, and the necessary rotation may be easily given to the screws 29 to restore the clutch to the proper working adjustment. The screws 29 may be reached by a screw driver through the apertures 32 and 33, as previously described. The pins 34 and 35 or 34ᶠ and 34ᵍ may then be restored to their positions. In performing this adjustment and in the removal of the said pins 34 and 35, it will, of course, be necessary to first remove the split pin 36. In performing this adjustment in connection with the modified form shown in Figs. 4, 5 and 6, it is necessary to first loosen the small set screws 34ᵉ, which may be reached by rotating the driven element or pulley 15 until the apertures 34ᵈ are in register with the apertures in which the set screws are placed.

In the modified form shown in Figs. 4, 5 and 6, the driving element may be very conveniently removed for inspection or repair by loosening the screws 52ª, which operation will allow the conical wedge or ring 50 to become easily disengaged from the shaft 17ª. By loosening the collar, the pulley may also be slid along the shaft and the parts are thus made entirely accessible.

In the modified form shown in Figs. 10, 11, 12 and 13, the friction surfaces are brought into engagement with greater accuracy and the wear is more uniform, and this advantage will be sufficient to warrant the duplication of the screw mechanism on the opposite side of the shaft in many cases.

In the application of our invention illustrated in Figs. 7, 8 and 9, our improvements become very convenient and advantageous for reversing gearing as well as for clutching purposes. It will be seen that the operator by moving the rack bar 63 in one direction, by a pressure upon the lever connected therewith, one of the clutches 79 is brought into engagement with the shaft 61 and the other clutch 79ª is disengaged. One of the bevel gears 70, 70ª is thereby made to actuate the gear 73 and the shaft 74 is driven in one direction. By reversing the pressure upon the controlling lever which actuates the rack bar 63, the other clutch 79ª is made to engage the shaft 61 and the other clutch 79 is disengaged therefrom. This causes the pinion 70ª to drive the gear 73 and hence the shaft 74 is given a movement in the opposite direction.

It will be seen that there is an intermediate position of the rack 63 in which the two gears 66 66ª will hold the parts of both clutches in a disengaged condition. In this condition of the clutches, the shaft 61 can of course continue to rotate without driving the shaft 74.

In this application of our improvements a casing is provided to cover the mechanism and keep out the dirt. A quantity of oil is kept in said casing which lubricates all of the bearing surfaces, and prevents undue wear thereof, when the clutch is allowed to slip, as occurs when an automobile is started or driven at a low speed.

Our clutch is, of course, applicable to many cases not here mentioned, as we have endeavored to describe and illustrate in the drawings the more common conditions to which it may be applied.

While we have described our invention more or less precisely as regards the details of construction, we do not wish to be understood as limiting ourselves thereto, as we contemplate changes in form and the proportion of parts and the substitution of equivalents as circumstances may suggest or render expedient without departing from the spirit of our invention.

We claim:

1. In a device of the character described, a driven element, a driving element divided into parts, a screw attached to each part, a threaded member fitted to a pair of said screws, one on each part and having opposite threads, and removable means by which each screw is attached to its part of the driving element, each part of the driving element having an aperture to permit access to the screw attached to it for effecting adjustment of the same, said driven element having an aperture to permit access to the aperture in the driving element.

2. In a friction clutch, a driving element, a driven element, movably mounted friction members, a sleeve having interior right and left screw threads at its opposite ends, right and left screws seated in bearings in said friction elements and engaging said screw threaded sleeve, said screws having angularly disposed transverse openings, lock pins adapted to pass through said openings, and through openings in said friction elements, means for holding said pins in place, said driven element and friction members being provided with openings adapted to register for permitting access to said screws for adjustment thereof, a spur gear rigid with said sleeve and a rack engaging said gear.

3. In a friction clutch, a hollow cylindrical driven element, a driving shaft, movably mounted friction elements within said cylindrical driven element and non-rotatably engaging said shaft, a sleeve having interior right and left screw-threads at its opposite ends, a gear wheel rigid with said sleeve, a rack meshing with said gear wheel, screws having spherical heads seated in spherical recesses in said friction elements, and engaging said screw-threaded sleeve, said friction elements having openings extending from said spherical recesses to the outside thereof, said cylindrical driven element being also provided with openings adapted to register with said first mentioned openings for permitting access to said screws to permit adjustment thereof.

4. In a friction clutch, a driving shaft, a slotted inner ring encircling said shaft and having a conical outer surface, an outer ring having an interior conical surface fitted to said inner ring, means for forcing said rings together to clamp them to each other and to said shaft, a hollow cylindrical driven member, friction members within said driven member and pivoted to each other and to said outer ring, and means for forcing said friction members outward against said driven member and for withdrawing them therefrom.

5. In a friction clutch, a driving shaft, a slotted inner ring encircling said shaft and having a conical outer surface, an outer ring having an interior conical surface fitted to said inner ring, means for forcing said rings together to clamp them to each other and to said shaft, a hollow cylindrical driven member, friction members within said driven member and pivoted to each other and to said outer ring, oppositely screw threaded members having spherical heads seated in spherical seats in said friction members, pins engaging openings in said oppositely threaded members and in said friction members, an operating member having opposite screw threads engaging said screw threaded members, a pinion rigid with said operating member, and a rack extending longitudinally of said shaft through the slot in said inner ring and engaging said pinion.

6. In a friction clutch, pivoted friction elements, oppositely disposed reversely threaded screws, pivoted to said friction elements, a screw threaded sleeve engaging said screws, said sleeve and screws being seated in recesses in said friction elements, said recesses being elongated in cross section forming clearance spaces to permit rotation of said screws on their pivots but forming a snug bearing upon said sleeve and the head of said screws midway between said clearance spaces.

In testimony whereof, we have subscribed our names.

HENRY W. JACOBS.
HOWARD H. LANNING

Witnesses:
 FRANK MITCHELL,
 D. C. THOMAS.